United States Patent
Kaukojärvi et al.

(10) Patent No.: US 10,008,951 B2
(45) Date of Patent: Jun. 26, 2018

(54) SYSTEM AND METHOD FOR COUPLING A MONOPHASE POWER SOURCE TO A MULTIPHASE POWER NETWORK

(71) Applicant: Fortum Oyj, Espoo (FI)

(72) Inventors: Pasi Kaukojärvi, Fortum (FI); Sebastian Johansen, Fortum (FI)

(73) Assignee: FORTUM OYJ, Espoo (FI)

( * ) Notice: Subject to any disclaimer, the term of this patent is extended or adjusted under 35 U.S.C. 154(b) by 0 days. days.

(21) Appl. No.: 14/765,347

(22) PCT Filed: Feb. 3, 2014

(86) PCT No.: PCT/FI2014/050081
§ 371 (c)(1),
(2) Date: Aug. 3, 2015

(87) PCT Pub. No.: WO2014/118440
PCT Pub. Date: Aug. 7, 2014

(65) Prior Publication Data
US 2015/0365007 A1 Dec. 17, 2015

(30) Foreign Application Priority Data
Feb. 4, 2013 (FI) .................................. 20135107

(51) Int. Cl.
*H02M 5/04* (2006.01)
*H02J 3/26* (2006.01)
(Continued)

(52) U.S. Cl.
CPC ................. *H02M 5/04* (2013.01); *H02J 3/00* (2013.01); *H02J 3/26* (2013.01); *H02J 3/381* (2013.01);
(Continued)

(58) Field of Classification Search
CPC ....... H01L 31/02021; H02J 3/383; H02J 3/26; H02J 3/381; H02J 3/00; H02J 3/005;
(Continued)

(56) References Cited

U.S. PATENT DOCUMENTS 4,651,340 A * 3/1987 Marson .................. H04Q 1/023
379/156
2005/0006958 A1* 1/2005 Dubovsky ............... H02J 3/382
307/64
(Continued)

FOREIGN PATENT DOCUMENTS

CN 102714414 A 10/2012
DE 102008027887 A1 9/2009
(Continued)

OTHER PUBLICATIONS

English translation of the Japanese Office Action for Japanese Application No. 2015-555763, dated Nov. 28, 2017.

*Primary Examiner* — Fred E Finch, III
*Assistant Examiner* — Demetries A Gibson
(74) *Attorney, Agent, or Firm* — Birch, Stewart, Kolasch & Birch, LLP (57) ABSTRACT

The invention relates to decentralized energy production. In particular, the invention concerns a system for coupling a monophase power source to an internal multiphase power network of a household, company, or other property. The internal network is further connected to an external power distribution grid. The system comprises an interface unit comprising a first connection point for said monophase power source and a second connection point for said multiphase power network, the interface unit allowing for monophase power from the monophase power source to be fed to the multiphase network, and means functionally connected to the interface unit for monitoring the loading states of individual phases of the multiphase power network.

(Continued)

The interface has coupling means to couple monophase power to selectively one of the phases of the multiphase power network based on the loading states of the individual phases of the multiphase power network. The invention improves cost-efficient usage of locally produced power and saves transmission losses.

19 Claims, 4 Drawing Sheets

(51) Int. Cl.
   *H02J 3/00* (2006.01)
   *H02J 3/38* (2006.01)
   *H02M 5/14* (2006.01)
(52) U.S. Cl.
   CPC ............... *H02J 3/005* (2013.01); *H02M 5/14* (2013.01); *Y02E 40/50* (2013.01)
(58) Field of Classification Search
   CPC ... Y02E 10/563; Y02E 40/50; Y10T 307/707; H02M 5/04; H02M 2003/1586; H02M 7/48; H02M 7/487; H02M 5/14
   See application file for complete search history.

(56) References Cited

U.S. PATENT DOCUMENTS

| | | | |
|---|---|---|---|
| 2006/0285855 A1* | 12/2006 | Sun | H03L 7/085 398/155 |
| 2007/0179720 A1 | 8/2007 | Becker et al. | |
| 2009/0189456 A1 | 7/2009 | Skutt | |
| 2010/0067271 A1 | 3/2010 | Garces et al. | |
| 2010/0235010 A1* | 9/2010 | Cooper | H02J 3/383 700/295 |
| 2011/0075455 A1* | 3/2011 | Sigamani | H02M 7/48 363/71 |
| 2011/0089766 A1 | 4/2011 | Fornage | |
| 2011/0210608 A1 | 9/2011 | O'Brien et al. | |
| 2011/0298292 A1 | 12/2011 | Bremicker et al. | |
| 2012/0086286 A1* | 4/2012 | Raabe | H02J 3/14 307/140 |
| 2012/0170341 A1* | 7/2012 | Fornage | H02M 7/5387 363/132 |
| 2012/0175951 A1 | 7/2012 | Pamulaparthy et al. | |
| 2012/0249121 A1* | 10/2012 | Pamulaparthy | G01D 4/002 324/86 |
| 2013/0030588 A1 | 1/2013 | Smith et al. | |
| 2013/0062970 A1 | 3/2013 | Maier et al. | |
| 2014/0254227 A1* | 9/2014 | Hantschel | H02J 3/383 363/131 |
| 2014/0301124 A1* | 10/2014 | Wu | H02M 7/49 363/132 |
| 2015/0308412 A1* | 10/2015 | Zagrodnik | H02M 7/003 290/44 |
| 2016/0294276 A1* | 10/2016 | Onishi | H02M 1/36 |

FOREIGN PATENT DOCUMENTS

| | | |
|---|---|---|
| DE | 202010006020 U1 | 8/2011 |
| DE | 102010020609 A1 | 11/2011 |
| DE | 102011078047 A1 | 12/2012 |
| FR | 2970124 A1 | 7/2012 |
| JP | H05308780 A | 11/1993 |
| JP | 6-253457 A | 9/1994 |
| JP | 7-135739 A | 5/1995 |
| JP | 2003-70166 A | 3/2003 |
| JP | 2006-280106 A | 10/2006 |
| JP | 2008306805 A | 12/2008 |
| JP | 2008312372 A | 12/2008 |
| JP | 2012-10536 A | 1/2012 |
| JP | 2012-147662 A | 8/2012 |
| JP | 2013-530667 A | 7/2013 |
| WO | WO2006100918 A1 | 9/2006 |
| WO | WO 2011/089181 A1 | 7/2011 |
| WO | WO 2011/141416 A2 | 11/2011 |
| WO | WO2012175332 A1 | 12/2012 |

\* cited by examiner

SYSTEM AND METHOD FOR COUPLING A MONOPHASE POWER SOURCE TO A MULTIPHASE POWER NETWORK

FIELD OF THE INVENTION

The invention relates to a system for coupling a decentralized energy source to an electrical network, such as a household electrical network, which is further connected to a regional electrical grid. The invention also relates to a corresponding method.

BACKGROUND OF THE INVENTION

Electrical power is typically delivered to households and other properties using an electrical distribution grid as three-phase power. In a household, some high-power devices, such as ovens, stoves and hot-water heaters utilize all three phases and the smaller devices only one or two of the three phases, typically through the internal power network of the household. Although the internal power network of a household is designed in such a way that all phases are utilized, the load between the phases is in practice seldom even at a given moment of time. That is, there is a load unbalance between the phases.

Decentralized systems for energy production are becoming increasingly common. Such systems typically include renewable energy generator units such as e.g. wind power plants and photovoltaic (solar) power systems, which are typically coupled to the internal electrical network of a household using an inverter, for example. Such systems reduce the need for energy purchased from the distribution grid. However, in particular in the case of a one-phase inverter system, the load balance/unbalance between the three phases in the household's internal network is significantly affected when power is available from the decentralized energy source.

In some countries, it is also possible to feed power further into the electrical distribution grid if excess energy is produced by the renewable energy source. In some countries there is no such possibility due to technical limitations of electricity meters in the switchboards or due to restrictions by the authorities or power distributors. Even if such feed-in is possible, it is usually not economically profitable for the parties involved without the support of the state through feed-in-tariff policies and mechanisms. To avoid or minimize the need for feed-in of energy to the grid, it is preferred to use as much of the renewable energy produced at the household or some other facility. Feeding power to the distribution grid may also result in load unbalances between phases in the distribution grid, which may be harmful for the distribution grid and is therefore undesirable from the power supplier's point of view.

US 2011/298292 discloses a method for feeding three-phase current to a power grid and a solution to the load unbalance problem in the distribution grid in the particular case of a three-phase photovoltaic inverter system as the decentralized energy source. The solution is based on providing a central control and monitoring unit comprising a load unbalance detection function and a load unbalance control function allowing individual photovoltaic inverters to be entirely disconnected from the power grid by means of disconnectors as a result of a control command signal from a monitoring unit. The system is not applicable to a one-phase inverter system such that the power of the energy source would be utilized it the best possible way.

WO 2011/089181 discloses a method of leveling partial powers at a grid connection point between a multiphase power grid and a multiphase inverter unit. Neither this method can be used in a one-phase inverter system.

US 2011/210608 discloses a single stage power conversion system including a photovoltaic source and an inverter for delivery of power to a power grid. In addition, there is a load balancing unit coupled to the inverter and a controller configured to determine a maximum power point for the inverter system, regulate an output voltage of the inverter, compute a power balance difference between a power demand from the power grid and an output power of the inverter obtainable at the maximum power point and control in real-time the load balancing unit based on the power balance difference. The load balancing unit may be an energy storage unit or power dissipation unit. The system is aimed at optimizing power balance difference between a power demand from the power grid and an output power of the single stage inverter. The system does not relate to or solve the problem of load unbalance between individual phases of the power network the photovoltaic source is connected to.

There is a need for improved systems and method for coupling decentralized power production units to common electrical networks.

SUMMARY OF THE INVENTION

It is an aim of the invention to provide a system allowing for more rational production and use of power by decentralized power producers.

A specific aim is to provide an improved system and method for coupling a monophase power source to a multiphase AC power network.

One aim is also to decrease the need of feed-in of power to distribution grid.

The invention is based on the idea of providing between the decentralized energy source and its multiphase network connection point an interface unit, which is capable of selectively coupling the energy source to any of the phase lines of the multiphase network and monitoring equipment allowing for controlling the interface unit, in particular said coupling, depending on the load of the phase lines of the multiphase network.

More specifically, the invention is characterized by what is stated in the independent claims.

According to one embodiment, the present invention provides a system for coupling a monophase power source to an internal multiphase power network of a household, company, or other property, the internal network further being connected to an external power distribution grid. The system comprises an interface unit comprising a first connection point for said monophase power source and a second connection point for said multiphase power network, the interface unit allowing for monophase power from the monophase power source to be fed to the multiphase network, and means functionally connected to the interface unit for monitoring the loading states of individual phases of the multiphase power network. The interface unit is further configured to couple the monophase power to selectively one of the phases of the multiphase power network based on the loading states of the individual phases of the multiphase power network.

The monophase power source may comprise a renewable energy source such as a wind energy converter, photovoltaic module, fuel cell or wave energy generator. Typically, there is provided an energy converter, such as an inverter between the renewable energy source and the multiphase power network to provide monophase electric power which can be efficiently fed to the multiphase network.

According to one embodiment, the present method of feeding power from a monophase power source to a multiphase power network further coupled to a power distribution grid comprises producing electric power with the monophase power source, feeding power from the monophase power source to one of the phases of the multiphase power network, and monitoring the loading states of the phases of the multiphase power network. According to the invention, the phase of the multiphase power network to which the monophase power source is connected is, at least partially, determined based on the loading states of the phases of the multiphase power network. The loading state of the phases can be measured or monitored in a variety of ways, e.g. by current transducers that do not require direct contact with the phase current. These may be separate devices or they may be integrated in a power metering unit. Integration of load monitoring devices in a power metering unit opens the possibilities for remote control of the monophase power feed. The term "distribution (power) grid" refers to a typically municipal power grid or rural or city electrical network having for example individual households, properties or companies as subscribers. The term "internal (power) network" refers to the power systems of these subscribers. Between the distribution grid and internal network, there is typically a switchboard and/or electrical metering unit. The subscribers act as decentralized power producers.

The term "loading state of a phase" is used to describe the ability of the devices connected to that phase to absorb electric energy or, if there is an excess amount of locally produced energy, to feed energy to the external distribution grid. Thus, the monitoring means are capable of detecting the magnitude and direction of current flow between the distribution grid and the internal power network.

The term "phase" used separately, as in "coupling the monophase power source to a phase of the internal power network", can typically be read as "phase line", i.e., meaning the electrical wirings connected to a certain AC phase of a multiphase system.

The term "multiphase" covers e.g. common electrical networks with three alternating current lines with 120 degrees phase difference between the lines.

The present invention provides significant advantages. Most significantly, by means of the invention, the use of phases of the internal network can be balanced or optimized to a degree higher than before so that more locally produced energy is consumed within the internal network and less is fed to the distribution grid. The invention also allows for production of intelligent power production and consumption environments. The invention can be implemented using standard electrical components, whereby it is suited even for small properties, such as individual households and small companies with one or more renewable energy sources. This is of high importance in order for the renewable energy units to become more common.

Preferable embodiments are the subject of the dependent claims.

According to one embodiment the interface unit is configured to determine if another phase of the multiphase power network is capable of absorbing more current than the phase to which the monophase power source is presently coupled. In the affirmative case, the interface unit is adapted to couple the monophase current to the determined another phase. Preferably, this switching is made only if current is flowing out of the internal network towards the external distribution grid. For this purpose, the interface unit comprises means for determining, based on the signals from the monitoring means, if current is fed towards the power distribution grid from the phase the monophase power source is presently coupled, and suitable logic for performing said coupling to another phase only if current is fed towards the power distribution grid. By these embodiments, the energy locally produced can most efficiently be also used locally.

In some cases, it may be preferred to reduce the number of coupling switches, for example to avoid wear, if a switching device with contactor(s) is used by the interface unit, to make the one to one-of-three coupling. For this, purpose, there may be further logic implemented to the system.

According to one embodiment, the system comprises a data collection and analysis unit, which may physically be part of the interface unit or a separate unit, the data collection and analysis unit being capable of collecting power consumption and production data based on signals from said means for monitoring and the power source. The data is then statistically analyzed, for example by calculating an average consumption over a time period. The phase for coupling the energy source is then chosen based on the power consumption and production data by providing suitable control data or a control signal for the interface unit to make an appropriate coupling or appropriate couplings according to a programmed coupling schedule. According to one embodiment, the statistical analysis is made solely based on the power consumption or production data, which may be advantageous if the rate of power production or consumption in each of the phases, respectively, is predictable. Using these embodiments, the control of the power production system may be carried out in a statistically most optimal way. Also a learning system may be implemented, which utilizes predictive control for adapting to different expected power consumption and/or production situations.

According to one embodiment the feed phase of the multiphase network is selected to be a phase with largest momentary power consumption or statistical power consumption over a period of time. The period may be selected depending on the circumstances, and may vary from seconds to a year.

According to one embodiment, the system comprises a load activation switch for coupling an energy storage unit or power dissipation unit to one or more of the phases of the multiphase power network based on the loading states of the multiphase power network. This embodiment can be used for example to charge battery unit or to warm up a heat reserve unit, such as a hot water reservoir, if it is found out that not all the energy provided by the power source can otherwise be consumed locally. In other words, the load activation switch is adapted to activate an energy storage unit or power dissipation unit if energy is flowing from said multiphase power network to said power distribution grid to reduce or stop said flow. In addition to or instead of minimizing the feed-in or electricity to the distribution grid, the load activation switch too can be used to minimize the wear of any contactor(s) of the switching device in the interface unit. These and other embodiments and advantages of the invention will be more specifically discussed in the following detailed description with reference to the attached drawings.

DETAILED DESCRIPTION OF EMBODIMENTS

As is apparent from the discussion above, the present system is intended to minimize the current flow from an internal network of an energy production and consumption entity towards a distribution grid, whenever possible. This is achieved by using an interface unit which is capable of balancing the phase loads by inputting power from the power source to a phase line which has the highest capacity to absorb power. Exemplary embodiments for achieving this are described below.

Figure 1:
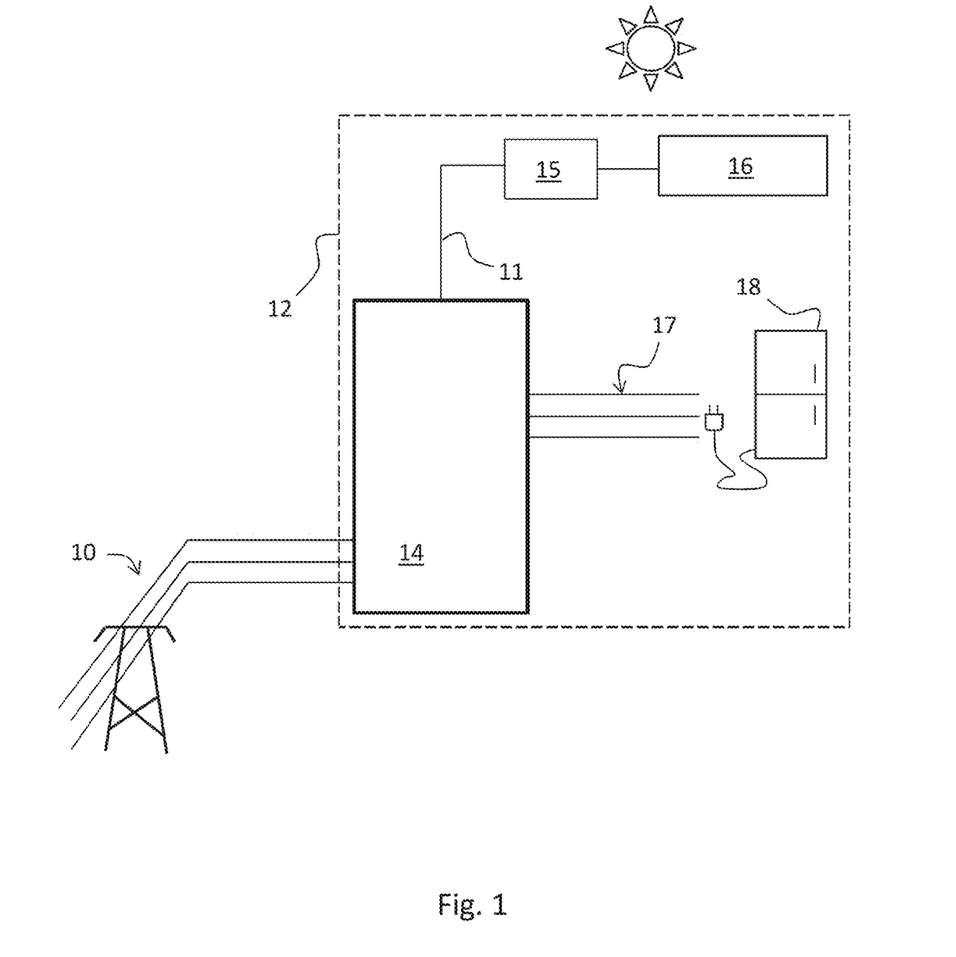
FIG. 1 shows a schematic view of an energy production and consumption system in which the present invention can be used.

FIG. 1 shows in a general level an energy production and consumption system 12 comprising a three-phase switchboard 14 and monophase electrical devices 18 connected thereto via an internal AC power delivery network 17, which typically includes both three-phase AC power lines and monophase AC power lines. The system comprises also a monophase energy source 16, such as solar modules, coupled via a monophase AC inverter 15 and a power line 11 to the switchboard 14. The switchboard 14 is also connected to an external three-phase AC power distribution grid 10.

Figure 2:
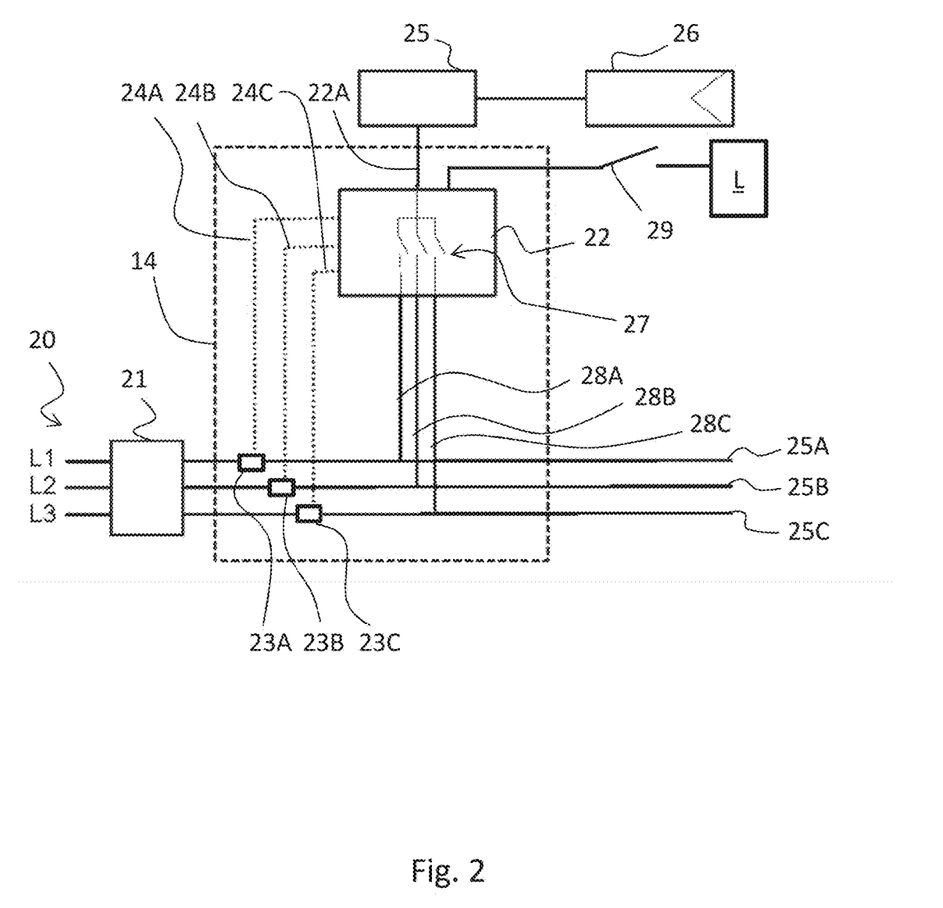
FIG. 2 shows a more detailed block diagram of a system according to one embodiment of the invention.

FIG. 2 shows a more detailed view of a switchboard 14 and its connections between power lines L1, L2, L3 of the distribution grid 20, internal power lines 25A, 25B, 25C of the internal network connected or connectable to various loads (not shown), and the power source 25, 26.

The internal network is connected to the distribution grid 20 via a power metering unit 21 capable of recording the total amount of power fed from the distribution grid 20 to the internal network and/or from the internal network to the distribution grid 20, either individually for each phase or as a sum for the phases.

The power source 25, 26 comprises a power production unit 26, such as photovoltaic modules or wind energy converter, and a monophase AC inverter 25 converting the output of the power production unit to a desired amplitude and frequency, such as 230 V and 50 Hz.

The central parts of the present invention are shown inside the dashed box. The output of the inverter 25 is connected via a first connection point 22A to an interface unit 22 comprising a switching device having one or more contactors 27 capable of connecting the output of the inverter 25 selectively to any of the three phases of the internal network via power feed connection points 28A, 28B, 28C. The switching device may also be using semiconductor or static switches.

Connected to each of the power lines 25A, 25B, 25C of the internal network, preferably at a measuring point close to the power metering unit 21, are means 23A, 23B, 23C for monitoring the momentary load of the power lines 25A, 25B, 25C, corresponding to total throughput of power at the location of the monitoring means 23A, 23B, 23C. The outputs of the monitoring means 23A, 23B, 23C are connected to the interface unit 22 via load metering lines 24A, 24B, 24C. The monitoring means 23A, 23B, 23C should be located in the internal power lines 25A, 25B, 25C between the second connection points 28A, 28B, 28C of the interface unit 22 with the internal power lines 25A, 25B, 25C and the metering unit 21, as shown in FIG. 2. No loads are preferably connected between the monitoring means 23A, 23B, 23C and the power metering unit 21.

The interface unit 22 may comprise also control means for controlling the one or more contactors 27 in a programmed way based on the data provided by the monitoring means 23A, 23B and 23C on the loading states of the internal power lines 25A, 25B, 25C. If power is available from the power source 26 to one of the power lines 25A, 25B, 25C, this shows as reduced power (current) flowing through that power line at the monitoring points 23A, 23B, 23C. If the power exceeds the need of the devices connected to that particular power line and the power metering unit 21 allows for feed-in of power to the distribution grid 20, the load is negative, i.e. power is flowing towards the distribution grid.

The monitoring means 23A, 23B, 23C may comprise any known type of measurement devices capable of detecting the power or current flowing through the individual internal power lines 25A, 25B, 25C the devices are connected to. Particularly advantageous are current transducers that do not require direct contact with the phase current. These can be current transformers or Hall sensors of e.g. split-core or ring type. The monitoring means 23A, 23B, 23C may be separate devices or they may be integrated to the power metering unit 21.

According to one embodiment, the interface unit 22 is a separate module attachable to an electrical switchboard 14 and contains necessary inputs and outputs for the connections described above and shown in FIG. 2.

According to an alternative embodiment, the interface unit 22 is integrated into an electronics unit of a decentralized power production system. It may be for example a physical part of the inverter 25.

According to a further preferred embodiment, especially in the case the power metering unit 21 has the current transducers 23A, 23B and 23C integrated into itself, the interface unit 22 is controlled from the power metering unit 21 to steer the energy to the desired phase. If the power metering unit 21 is of a remotely controlled type, the actual control of the interface unit 22 may reside with the network operator or some other body having access to the remote control functionalities of the power metering unit 21. According to a further embodiment, the measurement of the loading states of the phases is used to activate an additional load coupled to the phase which is powered by the power source in case the power cannot be consumed internally otherwise. For this purpose, the interface unit is equipped with a load activation switch 29, which is functionally coupled to the load monitoring means and control logic of the interface unit. The additional load L may comprise e.g. a chargeable electrical energy reservoir, such as a battery unit, or a thermal energy reservoir, such as a water unit, which is heated with the excess energy provided by the energy source. Preferably, the load activation switch 29 can activate a load L in any of the phases of the internal network. By this embodiment, the changing of the input phase or a power feed back to the grid, can in some cases be replaced by load activation.

In the case of the power source 26 being a battery storage system, the load activation switch 29 and the additional load L can be replaced by using a bi-directional AC/DC converter 25, whereby the load activation means that the energy that cannot be consumed by any phase, is simply directed back as charging current for the battery storage system 26. or energy is taken from the battery to feed the loads instead of the external electrical grid.

Figure 3:
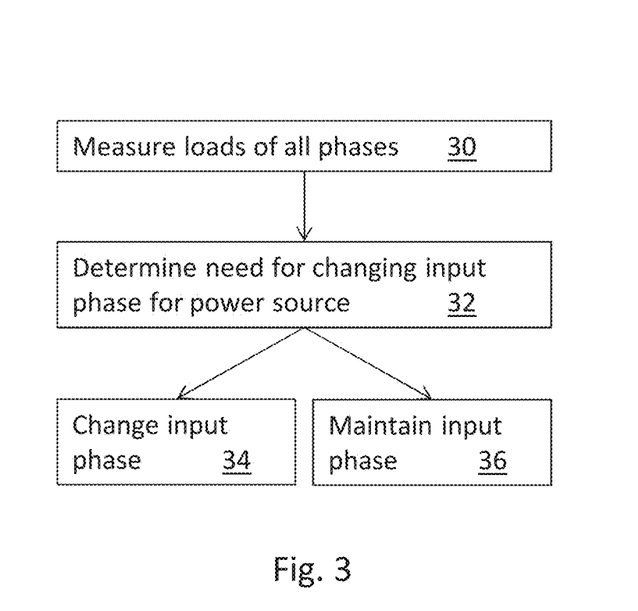
FIGS. 3-5 show flow charts depicting the control logic of the present invention according to various embodiments.

Turning now to the logic used to determine which phase line of the internal network should be connected to the power source, FIG. 3 shows an outline of the basic method according to one embodiment. In a starting situation where the power source is initially coupled to one of the phases of the internal network, the method starts in step 30 by measuring the loads of all phase lines. In step 32, the loads measured are used to determine if there is need to change the phase line the power source is coupled. In the affirmative case, the input phase is changed in step 34 by the interface unit to another phase. If no need for phase change is determined, the input phase is maintained in step 36 as an alternative to step 34.

Figure 4:
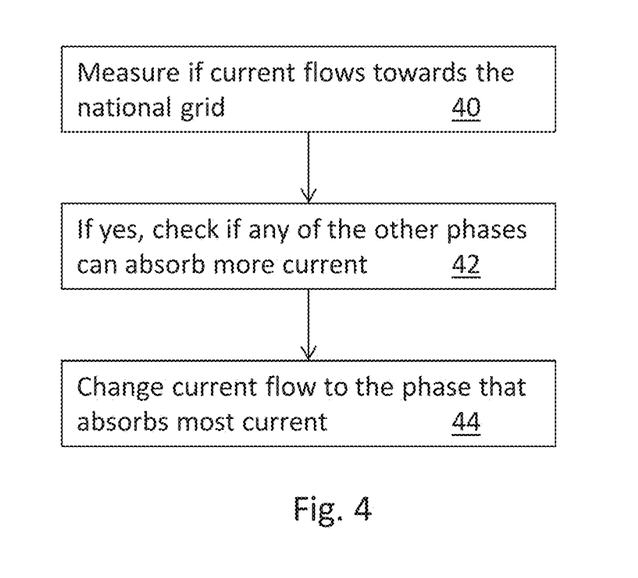

FIG. 4 shows in more detail the determination and phase changing steps according to one embodiment. In step 40, it is determined whether current is flowing towards the distribution grid from the phase the power source is presently coupled to. In step 42, it is determined whether any of the other phases can absorb more power than the initial phase, including any load coupled to any phase that can be activated by a separate load activation switch. If such other phase is found, the interface unit couples the power source to that phase in step 44.

According to one embodiment, the system comprises means for collecting statistical power consumption data of the phases of the internal network based on load monitoring using the load monitoring means. Such means may comprise a memory unit for storing a plurality load values or power consumption values and a computing unit for calculating a statistical power consumption value, such as a temporal sum value or an average value, from these values for each of the phases individually. Additionally, power production values from the power source can be collected using additional collection means (not shown), and these values can be stored and used for calculation of a statistical power production value.

Figure 5:
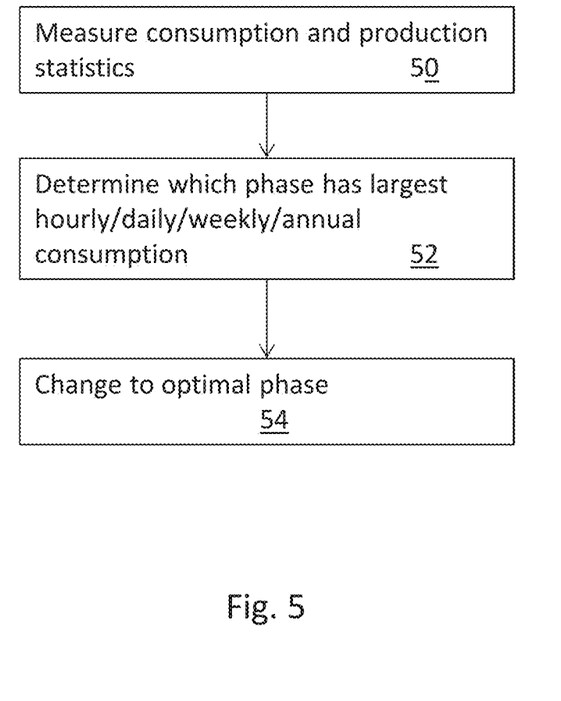

With reference to FIG. 5, in step 50, statistics is gathered using said collecting means. It is then determined in step 52 which phase has the largest consumption over a certain period of time. In step 54, the input phase of the power source is changed to the phase that has largest consumption. Naturally, the collection of the statistical data is continued as long as needed for having a reliable approximation of upcoming consumption. On the other hand time periods, even if equal in length, may have a different consumption profile during winter and summer, for example. Statistics based on long-term data collection may switch to different profiles automatically, or it may change gradually, as the actual load on the phases start to deviate from the applied statistical values.

The methods depicted in FIGS. 3-5 and described above can be implemented by a control logic unit, which is preferably integrated into the interface unit but may also be located in a separate unit or integrated into another functional unit of the system. The logic unit may comprise a data collection and analysis unit for performing the abovementioned statistical operations and decision-making. This may include a continuous monitoring of the power output from the inverter 25, in order to improve prediction and control of the system. Obviously, collecting data not only about the energy consumption and its variations in the multiphase network is important, but also to have the same information on the supply side from the output of the inverter 25.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for coupling a monophase AC current from a power source to a multiphase power network further connected to an external power distribution grid, the system comprising:
    an interface unit comprising a first connection point for said power source and a second connection point for said multiphase power network, the interface unit allowing for monophase AC current from the power source to be fed to the multiphase network, and
    means for monitoring the loading states of individual phases of the multiphase power network, said means for monitoring being functionally connected to the interface unit,
    wherein the interface unit is configured, in response to monitoring of the loading states of said individual phases, to couple the monophase AC current from said power source selectively to the individual phase of the multiphase power network having the largest power consumption.

2. The system according to claim 1, wherein the means for monitoring the loading states of individual phases of the multiphase power network comprise ring transformers.

3. The system according to claim 2, wherein said ring transformers are coupled to the phase wires of the multiphase power network between said second connection point of the interface unit and a connection point between the multiphase power network and the power distribution grid.

4. The system according to claim 1, wherein the means for monitoring the loading states of the individual phases of the multiphase power network are integrated into a power metering unit connected to said external power distribution grid, said power metering unit being remotely readable and controllable to generate control signals for the interface unit to couple the monophase AC current to selectively one of the phases of the multiphase power network.

5. The system according to claim 1, wherein the interface unit is configured to:
determine from said monitoring means if another phase of the multiphase power network is capable of absorbing more current than the phase to which the power source is presently coupled, and
in the affirmative, couple the monophase AC current to the another phase of the multiphase power network.

6. The system according to claim 5, wherein the interface unit is configured to:
determine from said monitoring means if current is fed towards the power distribution grid from the phase the power source is presently coupled, and
perform said coupling to another phase only if current is fed towards the power distribution grid.

7. The system according to claim 1, further comprising a data collection and analysis unit capable of:
collecting statistical power consumption data based on the measurements of said means for monitoring,
optionally, collecting statistical power production data from the power source,
selecting said one of the phases of the multiphase power network based on the power consumption data, and optionally the power production data, and
providing control data for the interface unit based on said determining for coupling the monophase AC current to said selected phase of the multiphase power network.

8. The system according to claim 1, further comprising selecting said one of the phases of the multiphase power network to be a phase with largest momentary power consumption or statistical power consumption over a period of time.

9. The system according to claim 1, wherein the interface unit is a separate module attachable to an electrical switchboard.

10. The system according to claim 1, wherein the interface unit is integrated into an electronics unit of a decentralized power production system.

11. The system according to claim 1, further comprising a load activation switch for coupling an energy storage unit or power dissipation unit to one or more of the phases of the multiphase power network based on the loading states of the multiphase power network.

12. The system according to claim 11, wherein said load activation switch is adapted to activate said energy storage unit or power dissipation unit if energy is flowing from said multiphase power network to said power distribution grid.

13. The system according to claim 1, wherein the power source comprises a renewable energy unit and an inverter for feeding the energy produced by the renewable energy unit to the internal multiphase power network.

14. The system according to claim 1, wherein the means for monitoring the loading states of individual phases of the multiphase power network comprise Hall sensors.

15. The system according to claim 2, wherein said Hall sensors are coupled to the phase wires of the multiphase power network between said second connection point of the interface unit and a connection point between the multiphase power network and the power distribution grid.

16. A method of feeding monophase AC current from a power source to a multiphase power network further coupled to a power distribution grid, the method comprising:
producing electric power with said power source,
feeding monophase AC current produced by said power source to one of the phases of the multiphase power network, and
monitoring the loading states of the phases of the multiphase power network, and
coupling, in response to monitoring of the loading states of said individual phases, monophase AC current from said power source selectively to the individual phase of the multiphase power network having the largest power consumption.

17. The method according to claim 16, further comprising:
determining, based on said monitoring, if current is flowing from the phase of the multiphase power network the power source is coupled to towards the power distribution grid,
determining if another phase of the multiphase power network can absorb more power, and
if another phase of the multiphase power network can absorb more power, coupling the power source to that phase of the multiphase power network.

18. The method according to claim 16, further comprising:
collecting statistical power consumption data of the phases of the multiphase power network based on said monitoring,
optionally, collecting statistical power production data from the power source, and
selecting said phase of the multiphase power network based on the power consumption data, and optionally the power production data.

19. The method according to claim 16, further comprising selecting said phase based on largest power consumption over a period of time using collected statistical power consumption data of the phases of the multiphase power network.

* * * * *